Figure 1:
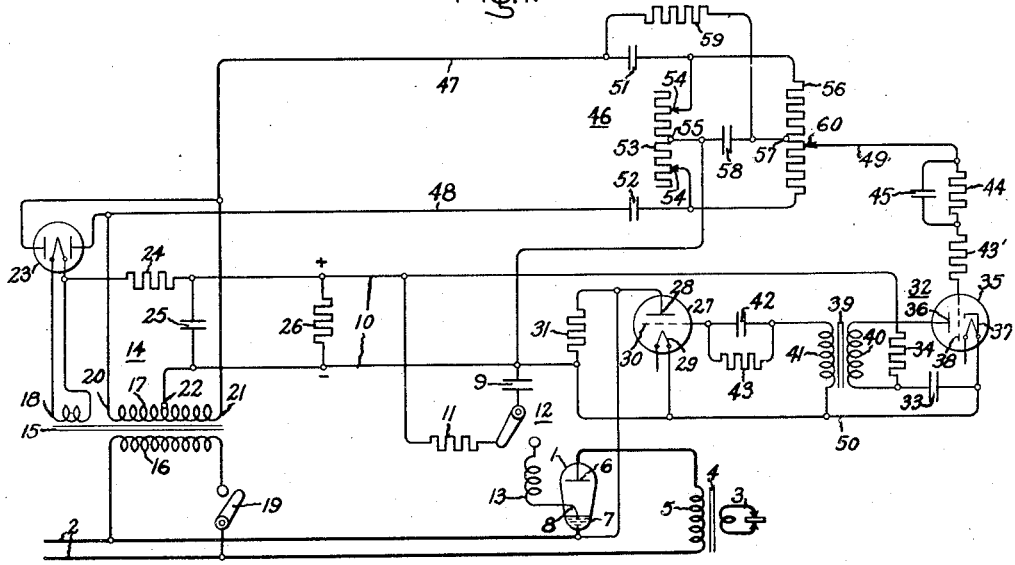

Feb. 6, 1940.   W. W. MOE   2,189,569
ELECTRIC VALVE CIRCUIT
Original Filed July 30, 1938

Inventor:
William W. Moe,
by Harry E. Dunham
His Attorney.

Patented Feb. 6, 1940

2,189,569

UNITED STATES PATENT OFFICE 2,189,569

ELECTRIC VALVE CIRCUIT

William W. Moe, Bridgeport, Conn., assignor to General Electric Company, a corporation of New York Original application July 30, 1938, Serial No. 222,255. Divided and this application April 29, 1939, Serial No. 270,889

5 Claims. (Cl. 172—238)

My invention relates to electric valve circuits and more particularly to electric valve circuits for effecting a single energization of a load circuit.

This application is a division of my co-pending patent application, Serial Number 222,255, filed July 30, 1938, and assigned to the assignee of the present application.

Electric valve circuits have been applied to arrangements for effecting energization of a load circuit from an alternating current supply circuit during a predetermined interval of time. The characteristics of electric valve apparatus make possible their use in circuits of this nature. For example, in electric welding operations, electric valve apparatus have been utilized because of the facility with which current may be initiated and interrupted. For instance, in spot welding operations electric valve apparatus may be employed to effect the transfer of a predetermined amount of energy to a load circuit during an accurately determinable interval of time. Various control arrangements have been applied to electric valve apparatus for effecting this type of control. In accordance with the teachings of my invention described hereinafter, I provide a new and improved control circuit whereby a predetermined amount of energy may be transmitted to a load circuit from an alternating current circuit.

It is an object of my invention to provide a new and improved electric valve circuit.

It is another object of my invention to provide a new and improved control system for electric valve translating apparatus.

It is a further object of my invention to provide a new and improved electric valve control system for electric valve translating apparatus.

It is a still further object of my invention to provide a new and improved phase shifting circuit for controlling electric valves.

Briefly described, in the illustrated embodiment of my invention, I provide a new and improved phase shifting circuit for producing an alternating voltage of variable phase displacement with respect to the voltage of an associated alternating current supply circuit. The phase shifting circuit is of the static type employing a plurality of impedance elements and is arranged to provide a control voltage adjustable in phase throughout the leading and lagging quadrants. Adjustable elements of the phase shifting circuit are arranged to permit continuous control of the voltage throughout the leading and lagging quadrants without effecting an appreciable or objectionable variation in the magnitude of the voltage.

Figure 2:
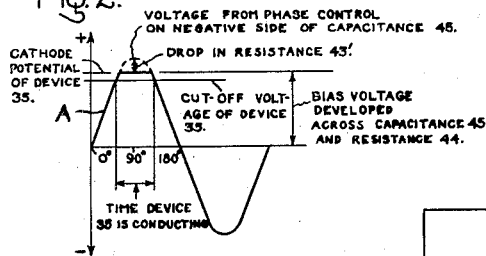
Figure 3:
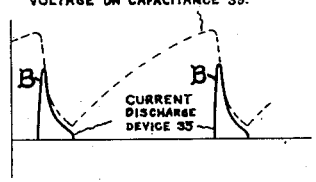
Figure 4:
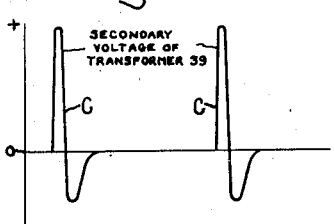
Figure 5:
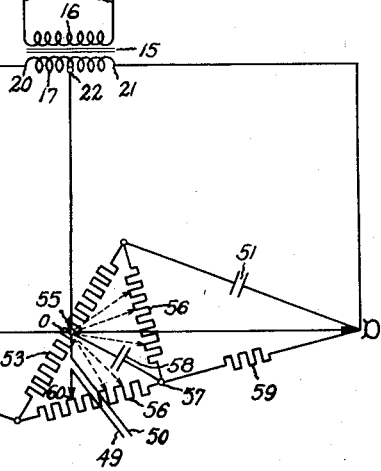

For a better understanding of my invention, reference may be had to the following description taken in connection with the accompanying drawing, and its scope will be pointed out in the appended claims. Fig. 1 of the accompanying drawing diagrammatically illustrates an embodiment of my invention as applied to a welding system, and Figs. 2, 3 and 4 represent certain operating characteristics thereof. Fig. 5 represents certain operating characteristics of the phase shifting circuit shown in Fig. 1.

Referring now to Fig. 1 of the accompanying drawing, my invention is diagrammatically illustrated as applied to a resistance welding circuit. An electric valve means 1 is interposed between an alternating current supply circuit 2 and a load circuit, such as a welding circuit 3. A transformer 4 is connected between the circuits, and the electric valve means 1 may be connected in series relation with a primary winding 5 of the transformer 4. The electric valve means 1 is preferably of the type employing an ionizable medium, such as a gas or a vapor, and comprises an anode 6, a cathode of the self-reconstructing type, such as a mercury pool cathode 7, and an associated control member 8 of the immersion-ignitor type having an extremity thereof extending below the surface of the mercury pool cathode 7. The immersion-ignitor control member 8 is preferably constructed of a material having a relatively high specific electrical resistivity relative to that of the associated cathode 7. For example, the immersion-ignitor control member 8 may be constructed of a material such as boron-carbide or silicon-carbide. An arc discharge is initiated between the anode 6 and the cathode 7 when a sufficiently large current is transmitted through the immersion-ignitor control member 8.

A capacitance 9 is connected to be charged from a suitable source of direct current 10 through a charging circuit comprising a resistance 11. A suitable circuit controlling means, such as a switching means or switch 12, is arranged to selectively connect the condenser 9 to the charging circuit or to the immersion-ignitor control member 8. An inductance 13 may be connected in series relation with the control member 8 to control the rate of discharge of the capacitance 9.

The source of direct current 10 may be provided by any suitable arrangement and I have chosen to represent it as being supplied by a circuit 14 comprising a transformer 15 having a primary cycle of voltage of circuit 2 or for a portion of a half cycle of voltage, depending upon the time during the cycle at which the immersion-ignitor control member 3 is energized. Of course, it is to be understood that the current which flows through the electric valve means 1 is maintained for a period of time after the line voltage passes through zero, by virtue of the inductance of the associated circuit. The duration of such period or extension in the time of conduction depends upon the power factor of the load circuit.

It is well understood by those skilled in the art that the average current transmitted by the electric valve means 1 and hence the amount of energy transmitted to the welding circuit 3 depends upon the time during the applied positive half cycle of anode-cathode voltage at which the electric valve is rendered conductive. The energy transmitted to the welding circuit 3 is increased as the time of initiation of the discharge is advanced towards the beginning of the positive half cycle and is, of course, decreased as the time of initiation of the discharge is retarded.

The manner in which the circuit 32 produces a periodic voltage of peaked wave form, which is impressed upon the control member 30 of the electronic discharge device 27, may be explained by considering the operating characteristics shown in Figs. 2–4. The capacitance 33 is charged from the direct current circuit 10 and is discharged at a predetermined time by the electronic discharge device 35. Curve A of Fig. 2 represents the alternating voltage impressed on grid 38 of discharge device 35 by the phase shifting circuit 46. Since in this unit the discharge device 35 is of the high vacuum type, the grid voltage is effective to interrupt as well as initiate the current transmitted by the discharge device. Resistance 44 and capacitance 45 and resistor 43 are proportioned to develop a negative biasing potential of a magnitude such that the electronic discharge device 35 conducts current during only a relatively small portion of a cycle as, for example, a sixty electrical degree interval occurring at about the peak of the voltage wave. Curves B of Fig. 3 represent the current transmitted to the primary winding 40 of transformer 39, and curves C of Fig. 4 represent the periodic voltage of peaked wave form induced in the secondary winding 41 of transformer 39. It will be observed that the peak of the voltage of peaked wave form, as represented by curves C, is about thirty electrical degrees ahead of the peak of the output voltage of the phase shifting circuit 46. To afford complete control of the energy transmitted to the welding circuit 3, or, in other words, to afford complete control of the heat transmitted to the weld, the phase shifting network 46 should be able to supply a voltage the phase of which can be varied in a continuous manner from sixty electrical degrees leading the power voltage of circuit 2 to one hundred twenty electrical degrees lagging that voltage. Furthermore, for proper operation of the electronic discharge device 35, the output voltage of the phase shifting circuit 46 should also supply a reasonably constant voltage over its operating range.

The operation of the phase shifting circuit or network 46 may be more fully explained by considering the diagram of Fig. 5. In this figure the various elements of the phase shifting circuit 46 are drawn in their approximate voltage vector positions in order to facilitate explanation of the operation of the circuit. Vector OD represents the voltage appearing between intermediate connection 22 and terminal 21 of winding 17 of transformer 15 and, of course, represents the anode-cathode voltage of the electric valve means 1. For the transmission of maximum current to the welding circuit 3, or, in other words, for the transmission of maximum welding heat to the work, it is required that a voltage leading the voltage of circuit 2 by sixty electrical degrees be impressed on the grid 38 of the electronic discharge device 35. This voltage is obtained by adjusting the position of the contact 60 along the resistance 56, as indicated by the dotted lines of Fig. 5. As the contact 60 is moved upward, the voltage impressed on the grid 38 is advanced in phase with respect to the voltage of circuit 2, and when it reaches the uppermost position the angle of advance is maximum. Conversely, as the adjustable contact 60 is moved downward the output voltage of the phase shifting circuit and hence the voltage impressed on grid 38 are retarded with respect to the voltage of circuit 2. Of course, there is a position for the contact 60 at which the potential impressed on the grid 38 is in phase with the voltage of circuit 2. I have found that the magnitude of the voltage impressed on the grid 38 is constant within a range of approximately plus or minus 15% over its operating range. Continuous phase adjustment of the voltage impressed on grid 38 may be obtained by positioning the adjustable contact 60. The variation in the output voltage of the phase shifting circuit 46 has a negligible effect on the operation of the electronic discharge device 35 and hence has a negligible effect on the peaked voltage produced by the circuit 32.

After an impulse of current is transmitted to the welding circuit 3 by moving the switch 12 to the right-hand position, the circuit may be reset by moving the switch 12 to the left-hand position where capacitance 9 is recharged through the circuit comprising resistance 11. The system is then in condition for another welding operation.

An important feature of this type of control is the uniformity of the welding current which is transmitted to the circuit 3. By virtue of the fact that the welding operation is initiated at a predetermined time during each cycle of voltage of circuit 2, the variation in the welding current is reduced to a minimum since the starting transients may be entirely eliminated, or substantially reduced, by controlling the time of initiation of the current relative to the power factor angle of the load circuit. Another important feature is the uniformity of control of the magnitude of the periodic voltage of peaked wave form produced by the circuit 32 and which is substantially independent of variations in the magnitude of the variable phase output voltage of the phase shifting circuit 46.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a source of alternating current, a winding energized from said source and including terminal connections and a connection electrically intermediate the terminal connections, a circuit connected across the terminal connections and including a pair of serially connected capacitances and a resistance, said resistance being connected between said capacitances and being provided with an intermediate connection connected to the intermediate connection of said winding, a voltage divider including a resistance connected across the first-mentioned resistance, a capacitance connected between the intermediate connection of the first-mentioned resistance and an intermediate connection of the second-mentioned resistance, and an output circuit connected between the intermediate connection of said winding and said voltage divider.

2. In combination, a source of alternating current, a winding energized from said source and including terminal connections and a connection electrically intermediate the terminal connections, a circuit connected across the terminal connections and including a pair of serially connected capacitances and a resistance, said resistance being connected between said capacitances and being provided with an intermediate connection connected to the intermediate connection of said winding, a voltage divider including a resistance connected across the first mentioned resistance, a capacitance connected between the intermediate connection of the first-mentioned resistance and an intermediate connection of the second-mentioned resistance, an impedance element connected between one terminal of said winding and the intermediate connection of said second-mentioned resistance, and an output circuit connected between the intermediate connection of said winding and said voltage divider.

3. In combination, a source of alternating current, a winding energized from said source and having terminal connections and a connection electrically intermediate the terminal connections, a circuit connected across the terminal connections and including a pair of serially connected capacitances and a resistance, said resistance being connected between said capacitances and having an intermediate connection connected to the intermediate connection of said winding, a second resistance connected across the first-mentioned resistance and being provided with an intermediate connection, a capacitance connected between the intermediate connections of the first-mentioned resistance and the second resistance, and an output circuit having one terminal connected to the intermediate connection of said winding and an adjustable terminal connected to the second resistance.

4. In combination, a source of alternating current, a winding energized from said source and having terminal connections and a connection electrically intermediate the terminal connections, a circuit connected across the terminal connections and comprising a pair of serially connected capacitances and a resistance, said resistance being connected between the capacitances and having an intermediate connection connected to the intermediate connection of said winding, a second resistance connected across the first-mentioned resistance, a capacitance connected between the intermediate connection of the first-mentioned resistance and in intermediate connection of the second resistance, an output circuit having one terminal connected to the intermediate connection of said winding, and means for controlling the phase of the voltage of the output circuit relative to the voltage of said source.

5. In combination, a source of alternating current, a winding energized from said source and having terminal connections and a connection electrically intermediate the terminal connections, a circuit connected across the terminal connections and comprising a pair of serially connected capacitances and a resistance, said resistance being connected between the capacitances and having an intermediate connection connected to the intermediate connection of said winding, a second resistance connected across the first-mentioned resistance, a capacitance connected between the intermediate connection of the first-mentioned resistance and an intermediate connection of the second resistance, an output circuit having one terminal connected to the intermediate connection of said winding, and means for continuously controlling the phase of the output circuit from a predetermined leading angle relative to the voltage of said source to a predetermined lagging angle and comprising an adjustable contact member associated with the second resistance.

WILLIAM W. MOE.